(12) United States Patent
Joanovic et al.

(10) Patent No.: US 7,720,950 B2
(45) Date of Patent: May 18, 2010

(54) DISCOVERY, MAINTENANCE, AND REPRESENTATION OF ENTITIES IN A MANAGED SYSTEM ENVIRONMENT

(75) Inventors: Vlad Joanovic, Oakville (CA); Ferit Findik, Sammamish, WA (US); Vitaly Voloshin, Issaquah, WA (US); Murat Ersan, Bellevue, WA (US); Varsha Jayasimha, Redmond, WA (US); Brett Eddy, Poulsbo, WA (US)

(73) Assignee: Microsoft Corporation, Redmond, WA (US)

( * ) Notice: Subject to any disclaimer, the term of this patent is extended or adjusted under 35 U.S.C. 154(b) by 919 days.

(21) Appl. No.: 11/142,573

(22) Filed: Jun. 1, 2005

(65) Prior Publication Data

US 2007/0005544 A1   Jan. 4, 2007

(51) Int. Cl.
*G06F 15/173* (2006.01)
(52) U.S. Cl. .................. 709/223; 709/203; 709/219; 709/220; 707/100
(58) Field of Classification Search ........... 709/222, 709/223, 224, 220, 221; 707/100; 715/734
See application file for complete search history.

(56) References Cited

U.S. PATENT DOCUMENTS

| | | | | |
|---|---|---|---|---|
| 5,491,796 | A * | 2/1996 | Wanderer et al. | 709/224 |
| 5,655,081 | A * | 8/1997 | Bonnell et al. | 709/202 |
| 6,041,347 | A * | 3/2000 | Harsham et al. | 709/220 |
| 6,154,776 | A * | 11/2000 | Martin | 709/226 |
| 6,167,448 | A * | 12/2000 | Hemphill et al. | 709/224 |
| 6,229,540 | B1 * | 5/2001 | Tonelli et al. | 715/735 |
| 6,230,200 | B1 * | 5/2001 | Forecast et al. | 709/226 |
| 6,308,206 | B1 * | 10/2001 | Singh | 709/223 |
| 6,401,119 | B1 | 6/2002 | Fuss et al. | |
| 6,490,617 | B1 * | 12/2002 | Hemphill et al. | 709/223 |
| 6,535,868 | B1 * | 3/2003 | Galeazzi et al. | 707/2 |
| 6,539,427 | B1 * | 3/2003 | Natarajan et al. | 709/224 |
| 6,549,943 | B1 * | 4/2003 | Spring | 709/223 |
| 6,567,814 | B1 * | 5/2003 | Bankier et al. | 707/101 |
| 6,584,502 | B1 * | 6/2003 | Natarajan et al. | 709/224 |

(Continued)

FOREIGN PATENT DOCUMENTS

WO        WO03053061        6/2003

(Continued)

OTHER PUBLICATIONS http://www3.ca.com/solutions/product.asp?id=2869.

(Continued)

*Primary Examiner*—Michael Won
(74) *Attorney, Agent, or Firm*—Lee & Hayes, PLLC

(57) ABSTRACT

Discovery, maintenance, and representation of entities in a managed system environment are described. Apparatus described herein includes one or more agents that run on respective serves that are managed within a management system, and that generate discovery data in response to a discovery rule. The apparatus also includes a management server that is adapted to transmit the discovery rules for execution by the agent, and to receive the discovery data from the agent. Methods described herein include defining the rules for discovering data about an entity on the server, and receiving the discovery data in response to the rule being executed in an environment in which the entity is deployed. Several types of user interfaces for presenting the discovery data are also disclosed.

12 Claims, 6 Drawing Sheets

U.S. PATENT DOCUMENTS

| | | | |
|---|---|---|---|
| 6,625,648 B1* | 9/2003 | Schwaller et al. | 709/224 |
| 6,664,978 B1 | 12/2003 | Kekic et al. | |
| 6,748,436 B1 | 6/2004 | Anand et al. | |
| 6,754,703 B1* | 6/2004 | Spring | 709/223 |
| 6,834,298 B1* | 12/2004 | Singer et al. | 709/220 |
| 6,988,134 B2* | 1/2006 | Thorpe et al. | 709/223 |
| 7,107,273 B2* | 9/2006 | Ohata et al. | 707/10 |
| 7,139,764 B2* | 11/2006 | Lee | 707/100 |
| 7,155,502 B1* | 12/2006 | Galloway et al. | 709/223 |
| 7,433,943 B1* | 10/2008 | Ford | 709/223 |
| 7,493,388 B2* | 2/2009 | Wen et al. | 709/224 |
| 2002/0085571 A1 | 7/2002 | Meandzija | |
| 2003/0200304 A1* | 10/2003 | Thorpe et al. | 709/224 |
| 2004/0249919 A1 | 12/2004 | Mattheis | |

FOREIGN PATENT DOCUMENTS

WO    WO 2004/081827    3/2004

OTHER PUBLICATIONS

"Efficient Administration of Homogeneous and Heterogeneous Computer Networks"; SC Venus, 4 pages.

IBM Think Research/Servers & Systems Management; http;//www.research.ibm.com/thinkresearch/systems.shtml; 1 page.

* cited by examiner

DISCOVERY, MAINTENANCE, AND REPRESENTATION OF ENTITIES IN A MANAGED SYSTEM ENVIRONMENT

TECHNICAL FIELD

This invention relates to discovery, maintenance, and representation of entities in a managed system environment.

BACKGROUND

Enterprise management systems, such as the Microsoft Operations Manager (MOM) available from Microsoft Corporation of Redmond, Wash., enable customers to manage many different components within their enterprises, including, but not limited to: servers, applications, devices, services, sites, desktops, and line of business applications. The list of managed components continues to grow and change constantly. With this growth and expansion, it becomes an increasing challenge to manage and usefully represent the state and status of each managed component. Another challenge arises in discovering, managing, and updating the many relationships between these managed elements.

SUMMARY

Discovery, maintenance, and representation of entities in a managed system environment are described herein. One or more agents that run on respective servers are managed within a management system, and generate discovery data in response to a discovery rule. A management server is adapted to transmit the discovery rules for execution by the agent, and to receive the discovery data from the agent. A user interface described herein enables the definition of rules for discovering data about an entity on a given server, and the discovery data is received in response to the rules being executed in an environment in which the entity is deployed.

Several types of user interfaces for presenting the discovery data are also disclosed. Computer-readable media for performing the foregoing functions are also provided.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

An overall process performed by the teachings herein can include enabling definition of one or more rules for discovering data about at least one entity related to, for example, a computer-based server. This aspect of the overall process is shown in more detail in FIG. 1, which illustrates an implementation in the context of an operations management system.

The overall process also can include receiving discovery data in response to the rules being executed in an environment in which the entity is deployed. This aspect of the overall process is shown in more detail in FIG. 2, which illustrates an implementation in the context of performing data discovery in an operations management system.

Figure 1:
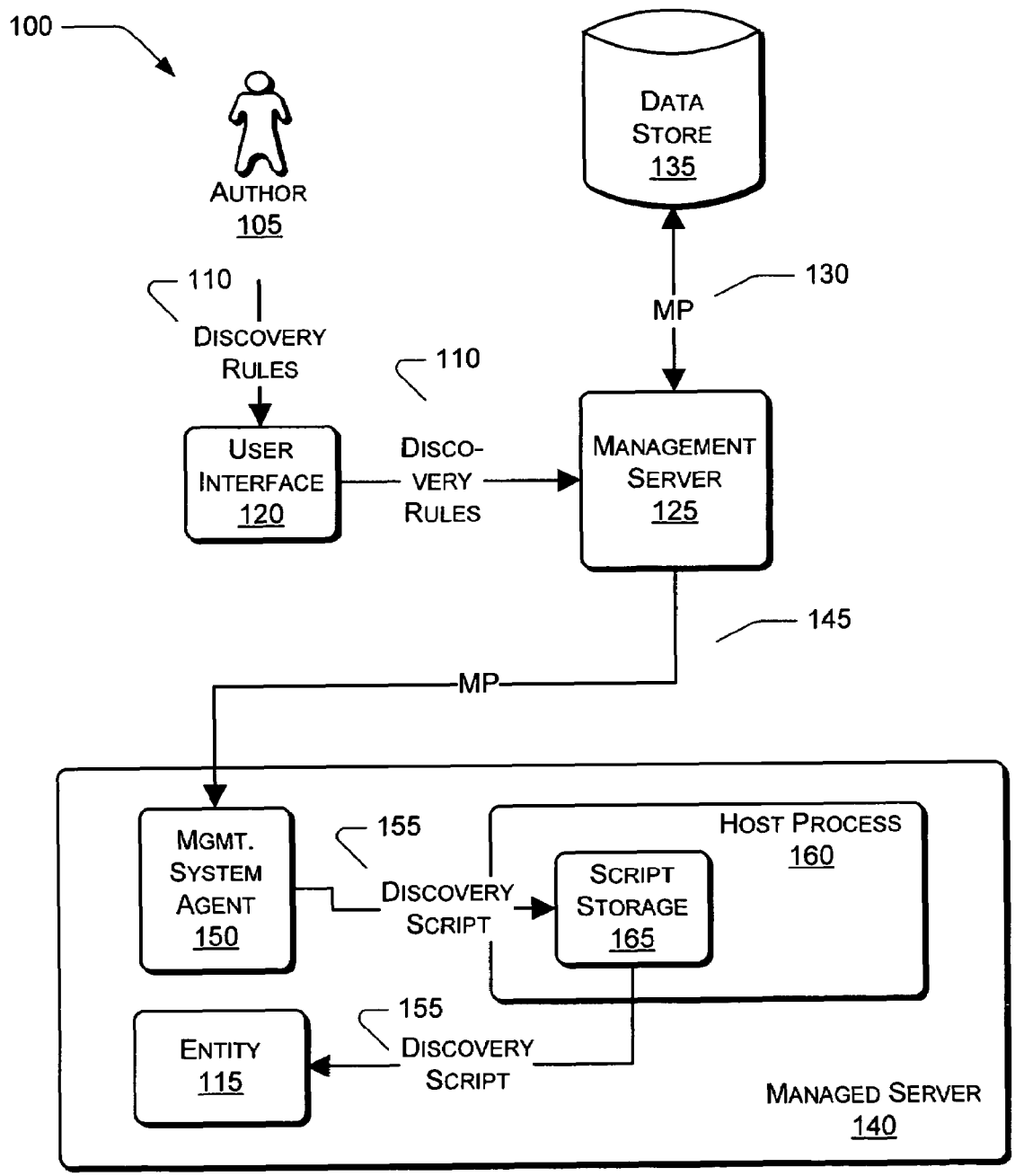
FIG. 1 is a block diagram illustrating various components and data flows associated with defining new rules for discovering an entity in the context of a managed system.

FIG. 1 illustrates a management system 100 featuring various components and data flows associated with performing service discovery. An author 105 drafts one or more discovery rules 110 that are designed to discover information about one or more services or entities 115 that are managed within the management system 100. A suitable example of the management system 100 is the Microsoft Operations Manager (MOM) system, available from Microsoft Corporation. Further background on the MOM system is readily available from the Microsoft website.

Generally, such a management system 100 enables the author 105 to specify rules 110 that can perform a variety of management-related functions within the management system 100. Examples of these rules 110 are the discovery rules 110 discussed herein. These discovery rules 110 can be collected from the author 105 via a user interface 120, and forwarded to a management server 125. The management server 125 can embody these discovery rules 110 into discovery scripts to be run later, and can load these discovery rules and related scripts into management packs (MPs) 130. The management server 125 can store the MPs 130 into a data store 135 for later retrieval.

The management server 125 is generally responsible for coordinating the management of remote entities, such as managed servers 140. One managed server 140 is shown in FIG. 1 for clarity and conciseness, but not limitation. Periodically, the MPs 130 are made available for download by or to the managed servers 140, and thus new MPs 130 are imported by the managed servers 140, as indicated by the line 145. The transmission of MPs 130 to the managed servers 140 can be implemented as either a push or pull model, or any combination of the foregoing.

A management system agent 150 on the managed server 140 receives the MPs 130, and extracts therefrom the discovery script 155 embodying the discovery rules 110 drafted by the author 105. The management system agent 150 then forwards the discovery script 155 to a host process 160. The host process 160 may be spawned specifically for executing the discovery script 155, or may be standing-by, having already been created. The discovery script 155 can be stored in a script storage structure 165 for convenience. The script storage structure 165 can take the form of a buffer, cache, or other form of relatively temporary memory location, and be implemented in connection with any suitable data structure.

The discovery script 155 can be defined to execute at any interval deemed appropriate by the author 105, for example, hourly, daily, weekly, or the like. At the interval specified in the discovery script 155, it is executed on the managed server 140 by the host process 160 to discover one or more entities 115. The discovery script 155 can be configured to discover information about any entity 115 within the domain of a given managed server 140. Examples of the entities 115 that can be discovered include any physical or logical device, any service, or any other component on the managed server 140.

Not only can the devices, services, or other components be discovered, but the relationships among the foregoing can also be discovered. For convenience, the different entities 115 that may be discovered on the managed servers 140 may be grouped into classes, with the discovery rules 110 locating specific instances of each class existing on a given managed server 140. The discovery rules 110 can also define the properties of each instance of a given class, and define the relationships among classes or instances of classes. To perform the foregoing functions, the discovery script 155 may utilize services such as the ACTIVE DIRECTORY™ service available from Microsoft, may refer to a system registry or other equivalent file structure indicating how the managed server 140 is configured, or the like.

The flexibility offered by the rule generation and execution process described above can enable customers using the management system 100 to evolve beyond managing their enterprises at a computer-by-computer level. Customers may not wish to manage each computer or other such entity in their enterprise on this type of a piecemeal basis, but instead may wish to manage on a "service" level, or a "group of services" level. Thus, the management approaches progresses beyond managing a set of physical devices toward managing a set of services or logical entities within the enterprise. For example, if a given enterprise includes a messaging and collaboration service such as the EXCHANGE SERVER™ service offered by Microsoft, the customer may not be as concerned with how many computers implement the service, or with the status of each computer, but instead may be more concerned with logical groups within the deployment of EXCHANGE SERVER, such as a group of servers designated as a "routing group". Other examples of entities 115 can include logical or physical disk drives, lists of SQL instances, and attributes of respective computers, such the version of the operating system they are running, a language identifier, or the like.

Figure 2:
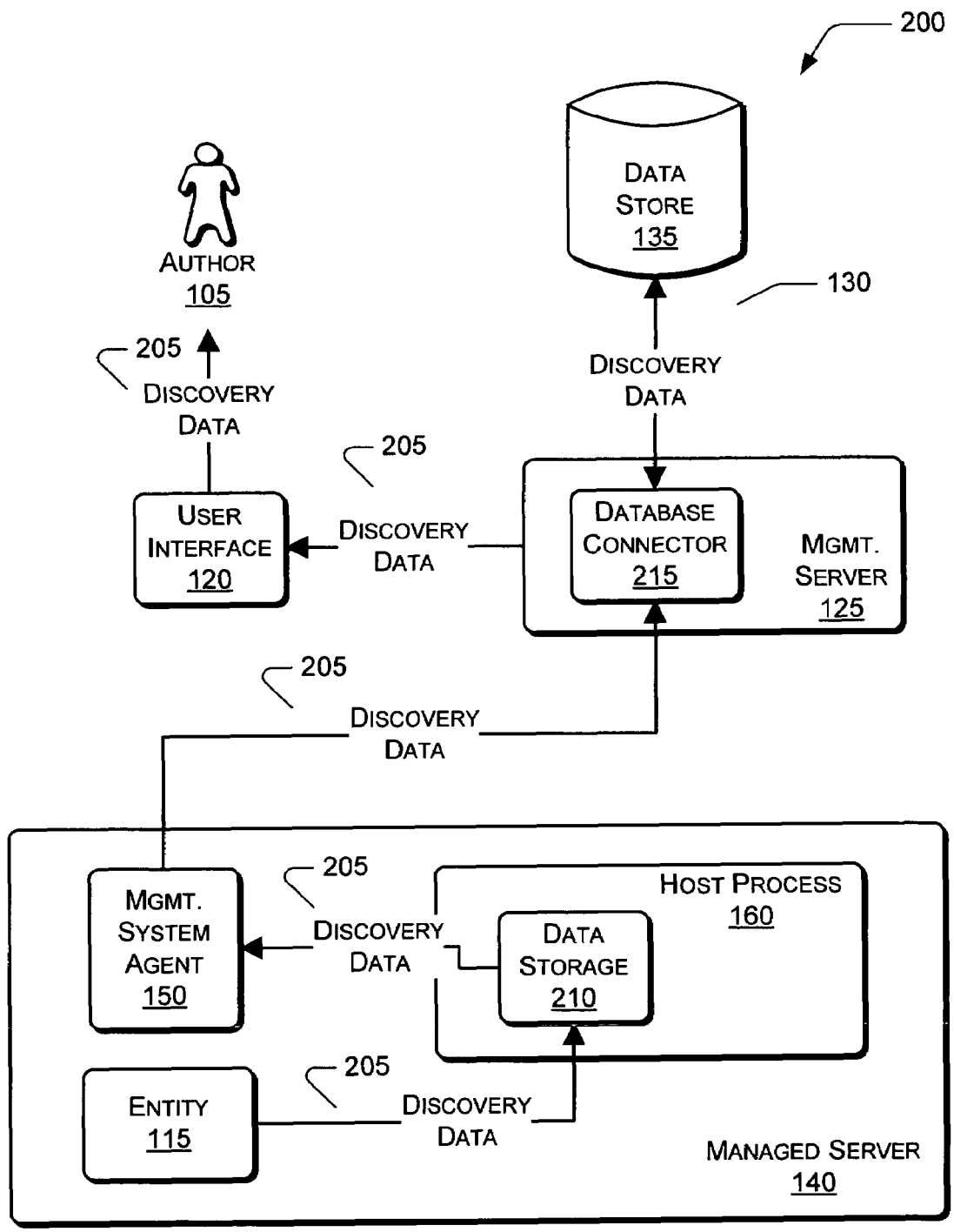
FIG. 2 is a block diagram illustrating various components and data flows associated with receiving and processing discovery data resulting from discovering the entity shown in FIG. 1.

FIG. 2 illustrates components and data flows 200 associated with the management system 100 when reporting discovery data after execution of the discovery script 155. As the discovery script 155 executes on the given managed server 140, it locates and gathers data about entities 115 in response to the discovery rules 110. This data is referred to generally herein as discovery data 205. As the discovery data 205 is located, the host process 160 can store it for convenience in a data storage structure 210, which may be implemented similarly to the script storage structure 165 discussed above in connection with FIG. 1.

The following is sample XML code that may be suitable for implementing the discovery data 205:

```
<DataItem TYPEID="79cbb19c-a897-440f-8e99-28c2649745ac">
  <InstanceID>{E5BC859E-E3F5-4C1D-8D76-1A5316E39ACF}</InstanceID>
  <ProviderID>{F320DA51-13BF-18D3-B3CD-00A0C53A28B4}</ProviderID>
  <ProviderName>MOM provider name</ProviderName>
  <Time TimeString="11/18/2004 01:51:16">38309.0772746759</Time>
  <Computer>DEVW2K3STD3</Computer>
    <RuleID>{89184DE1-6B0D-4D5D-8764-611F8E18552D}</RuleID>
    <ScopeID>{86C03298-37D5-4587-A40F-6BA618D9AC3E}</ScopeID>
  <Collections>
    <Collection>
        <ClassName>Class name</ClassName>
        <Scope>
          <Property>
              <Name>Property 1</Name>
              <Key Type="Boolean">1</Key>
          </Property>
          <Property>
              <Name>Property 2</Name>
              <Key Type="Boolean">0</Key>
          </Property>
        </Scope>
        <Instances>
          <Instance>
            <Property>
              <Name>Property 1</Name>
              <Value>Keyname</Value>
              <Key Type="Boolean">1</Key>
            </Property>
            <Property>
              <Name>Property 2</Name>
              <Value>value for property 2</Value>
              <Key Type="Boolean">0</Key>
            </Property>
          </Instance>
        </Instances>
    </Collection>
  </Collections>
</DataItem>
```

At a suitable time, the host process 160 can forward the discovery data 205 to the management system agent 150. The discovery data 205 pertaining to the entity 115 can be reported back alone, or can be combined with discovery data 205 pertaining to other entities 115 within the managed server 140. Also, the discovery data 205 can be reported immediately upon discovery, or can be collected for some time before reporting, as may be appropriate in particular applications. The processing for the discovery data 205 can be similar to processing other data items such as alerts, events, and other types of performance-related data in scripts.

In any event, the discovery data 205 can be reported to the management server 125, more particularly, to a database connector component 215. The database connector component 215 functions to organize the discovery data 205, and can further function to provide state context for various instances of the discovery data 205 as received by the management server 125. In one embodiment of the process flow 200, the discovery script 155 as executed at the level of a given managed server 140 at a given time is stateless, in that it does not maintain any memory or history of what it may have found on the given managed server 140 before.

Assume, for example, that at a first time $t_0$, the discovery script 155 executes to find three instances of a SQL server on the given managed server 140. Assume that later, at a time $t_1$, the discovery script 155 executes to find only two instances. In this embodiment, the discovery script 155 at time $t_1$ does not know what was found previously at $t_0$, because of its stateless nature. However, the database connector component 215 can maintain state context of what discovery data 205 resulted from various executions of the discovery script 155 at respective items. Therefore, the database connector component 215 can analyze various instances of a history of the discovery data 205, and can determine that one less instance of the SQL server exists at time $t_1$ as compared to what existed previously at time $t_0$. Therefore, the database connector component 215 can provide state context at the level of the management server 125 that may be missing at the level of the managed servers 140.

In an alternative embodiment, the managed servers 140 can be made more state-aware, such that they only report discovery data 205 back to the management server 125 when a given execution of the discovery script 155 results in discovery data 205 that is different from previous discovery data 205. In other words, the discovery data 205 is reported to the management server 125 only when the discovery data 205 changes. This alternative embodiment can reduce the volume of message flow between the managed servers 140 and the management server 125.

The database connector component 215 can also validate the discovery data 205 as reported by the various management system agents 150. For example, a given discovery script 155 may locate an instances of a given class "X" on a given managed server 140, and report this instance as part of the discovery data 205. As part of its analysis of the discovery data 205, the database connector component 215 can validate all classes included in the discovery data 205 by comparing them to, for example, a schema listing all valid classes. This schema may be stored in the data store 135, for example. If the given class "X" as reported in the discovery data 205 is invalid, the database connector component 215 can detect this condition as part of its analysis, and report this condition accordingly.

In any event, when the discovery data 205 is validated, the database connector component 215 loads it into the data store 135. Assuming the data store 135 is implemented as a database, tables within this database can be populated with the discovery data 205.

An illustrative but non-limiting object model for suitable for implementing a discovery script 155 for locating discovery data 205 is now described. The discovery script 155 can create discovery data 205 by calling a method to fill an object containing the discovery data 205, as follows:

objDiscData=ScriptContext.CreateDiscoveryData

After filling the discovery data object 205, the script can call a method to submit the discovery data 205 to the management server 125, as follows:

ScriptContext.Submit(objDiscData)

The following describes the object DiscoveryData, which is returned by the CreateDiscoveryData, and also describes other objects used by the DiscoveryData object.

DiscoveryData Object
The discovery data object has the following properties and methods:
Method CreateCollection( ): DiscoveryCollection
This method Creates an empty DiscoveryCollection object and returns it.
Method AddCollection(DiscoveryCollection obj)
Adds a collection object to the discovery data 205. A single instance of the discovery data 205 may contain multiple collection objects.
Property CollectionCount: Integer
Supports "Get" method. Returns the collection count of the current discovery data object.

DiscoveryCollection Object
The discovery collection object contains the instances discovered for a specific Class and for a specific scope. For example, a discovery collection object can contain a list of all SQL instances on a given machine "SERVER01".
Methods and properties are as follows:
Property ClassID:String
Supports "Get" and "Set". ClassID identifies the target class of which the collection contains instances. ClassID can be either a name that identifies the class, such as "SQLInstance", or a GUID such as "{5C46EDA4-AA2B-11D2-86B0-00A0C9AFE085}".
Method AddScopeFilter(String KeyPropertyId, String Value)
Adds a scope filter to the collection. A scope filter identifies the target set of instances that this collection is to contain. For example, if the collection contains a list of SQL Instances on Machine SERVER01, the scope can be defined by calling:
objCollection.AddScopeFilter("MachineName", "SERVER01")
If the collection contains information about a specific SQL Instance, such as SQL1, then the following scope filter can be added as well:
obj     Collection.AddScopeFilter("SQLInstance-Name","SQL1")
The KeyPropertyID parameter can be either a name of a property or a GUID of the property.
Method AddScopeProperty(String PropertyId)
Adds a property to the property list that identifies the properties of the Class that this collection has discovered. For example, if the collection contains a list of SQL Instances on machine "SERVER01", where each instance also contains the DBCount property, then this method can be called as follows:
Method AddScopeProperty("DBCount")
The parameter PropertyID can be either the name of the property or the GUID.

Property ScopeFilters:String
    Supports "GET". Returns a list of current scope filters in the collection as a string.
Property ScopeProperties:String
    Supports "GET". Returns a list of properties that this collection contains.
Method CreateInstance( ):DiscoveryInstance
    Creates a DiscoveryInstance object and returns it.
Method AddInstance(DiscoveryInstance obj)
    Adds a DiscoveryInstance object to the collection.
Property InstanceCount:Integer
    Returns the number of instances in the collection object.

DiscoveryInstance Object

This object can represent the properties collected for an instance. A collection object contains a list of instances, while each instance is represented with this object.

The methods and properties of this object are as follows:

Method AddProperty(String PropertyID, String Value)
    This method adds a property, value pair to the instance data. The PropertyID can be either a name or a GUID. The property specified here is added to the collection as a Scope Property, and can be a non-key property of the class. For example this method can be called as follows:
        objInstance.AddProperty("DBCount","12")
Method AddKeyProperty(String KeyPropertyID, String Value)
    This method adds a key property value to the instance object, in which the key property is used to identify the instance in question. Example usage for this method is as follows:
        objInstance.AddKeyProperty("SQLInstanceName", "S QL")
Property InstanceInfo: String
    Supports "GET". Returns a string which summarizes the contents of the instance object.

A sample script for discovering a list of SQL instances on a given machine follows:

```
//
// scenario: discover the list of SQL Instances on machine SERVER01
// including the DBCount Property
//
Dim objDiscData      // discovery data
Dim objSQLInstCollection // disc data for SQL Instance on SERVER01
Dim objInstance      // discovery data for one SQL Instance
// create the discovery event
objDiscData = ScriptContext.CreateDiscoveryData
// create collection for the result for SQL Instances on SERVER01
objSQLInstCollection = objDiscData.CreateCollection
// specify that Collection is for SQLInstance Class
objSQLInstCollection.ClassID = "SQLInstance"
// specify that collection contains results for only on machine SERVER01
objSQLInstCollection.AddScopeFilter("MachineName","SERVER01")
// specify that collection will also contain the DBCount property of
// the SQL Instance
objSQLInstCollection.AddScopeProperty("DBCount")
//
// after some queries, assume script has discovered the SQL Instances
//   SERVER01\SQL1  with DBCount=10, SERVER01\SQL2  with DBCount=3
//
// create the instance that will contain info for SERVER01\SQL1
objInstance = objSQLInstCollection.CreateInstance
//
// specify the SQLInstance Name which identifies the instance of
// SQLInst class
objInstance.AddKeyProperty("SQLInstanceName","SQL1")
// specify the DBCount property
```

```
objInstance.AddProperty("DBCount","10")
// add the Instance to the collection
objSQLInstCollection.AddInstance(objInstance)
//
// add the instance FERITF/SQL2 to the collection as well
objInstance = objSQLInstCollection.CreateInstance
objInstance.AddKeyProperty("SQLInstanceName","SQL2")
objInstance.AddProperty("DBCount","3")
objSQLInstCollection.AddInstance(objInstance)
//
// add the collection to the discovery data
objDiscData.AddCollection(objSQLInstCollection)
//
// discovery data is ready to be sent, send it
ScriptContext.Submit(objDiscData)
// DONE...
```

The user interface 120 can take several different forms in various implementations of the teachings herein, and can present the discovery data 205 received from the various managed servers 140 in a variety of ways. The data presented by these various forms of the user interface 120 are based on discovery data 205 as can be stored in the data store 135.

Figure 3:
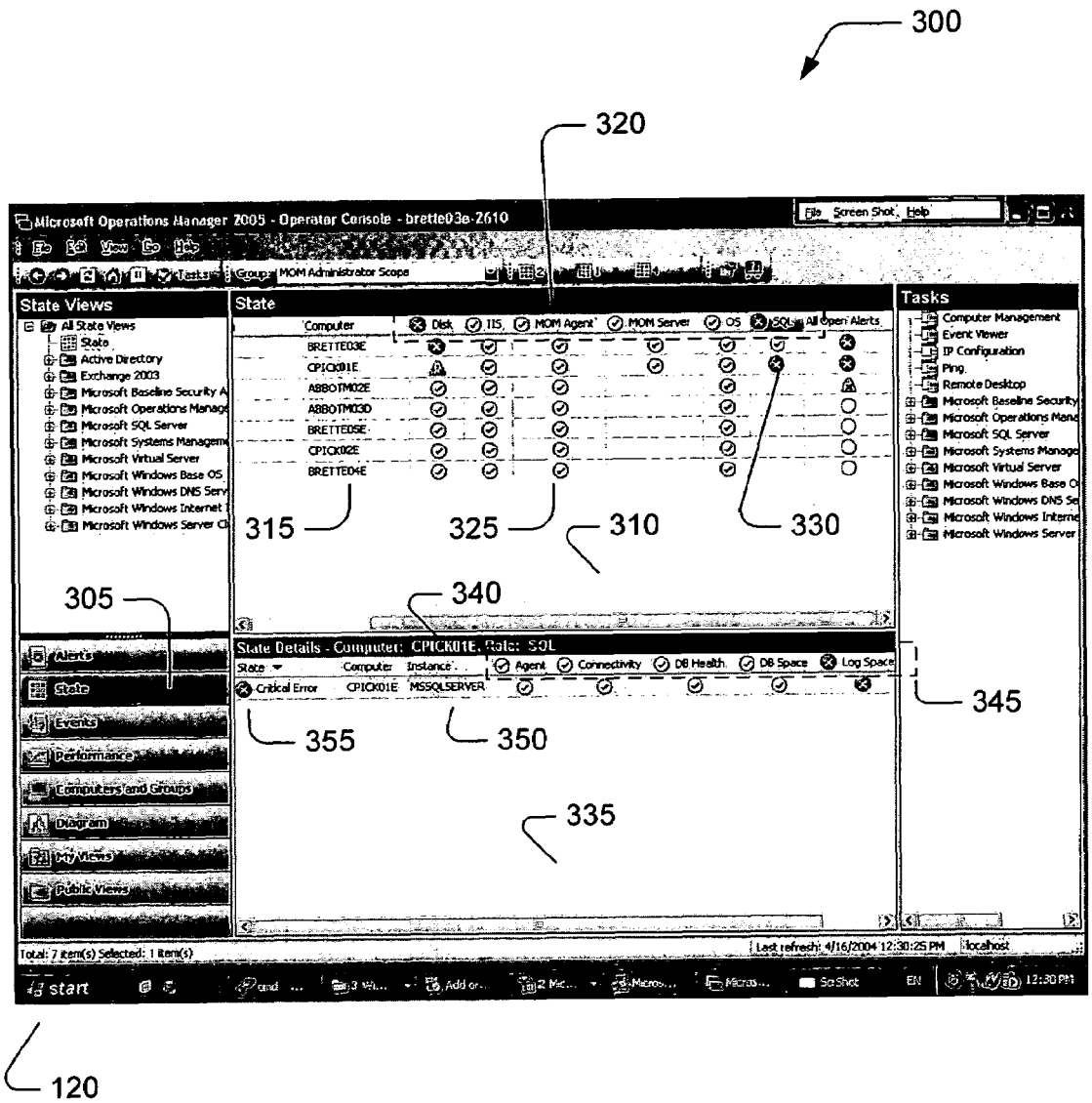
FIG. 3 is a diagram of a user interface that provides a state view of the discovery data.

FIG. 3 illustrates an implementation of the user interface 120 that provides a state view 300 of the discovery data 205. The state view 300 can be activated by, for example, clicking on the field 305 labeled "State". Within area 310, column 315 lists several computers discovered on various managed servers 140, along with a name for each computer. These names may be discovered from the computer itself, or the names may be pulled from an entry provided by a service such as ACTIVE DIRECTORY. The illustrative roles 320 are examples of classes that might be defined by MPs 130 and referenced by the discovery rules 110. These classes are discovered by the discovery scripts 155 as they are executed on the various managed servers 140. Because area 310 is arranged as a two-dimensional grid, with roles 320 forming one axis and computers 315 forming the other, each cell within this grid can contain an icon 325 indicating the state of each given role 320 on each given computer 315. The meaning of each of the illustrative icons 325 is given in the legend shown in FIG. 5.

The state of a given role 320 on a given computer 315 can be shown in more detail, for example, by clicking on a cell 330, which represents the intersection of the role "SQL" with the computer "CPICK01E". In response to user input to cell 330, the state view 300 presents additional data in a field 335. The contents of this field 335 are indicated by the banner 340, which indicates the computer "CPICK01E" and the role "SQL". Within field 335, a set of properties are shown for the SQL role or class, along with corresponding icons representing the state of each property. A column 350 lists a name for each instance of the role 320 as it appears on the computer 315, and an icon 355 indicates an overall status of each instance 350.

Figure 4:
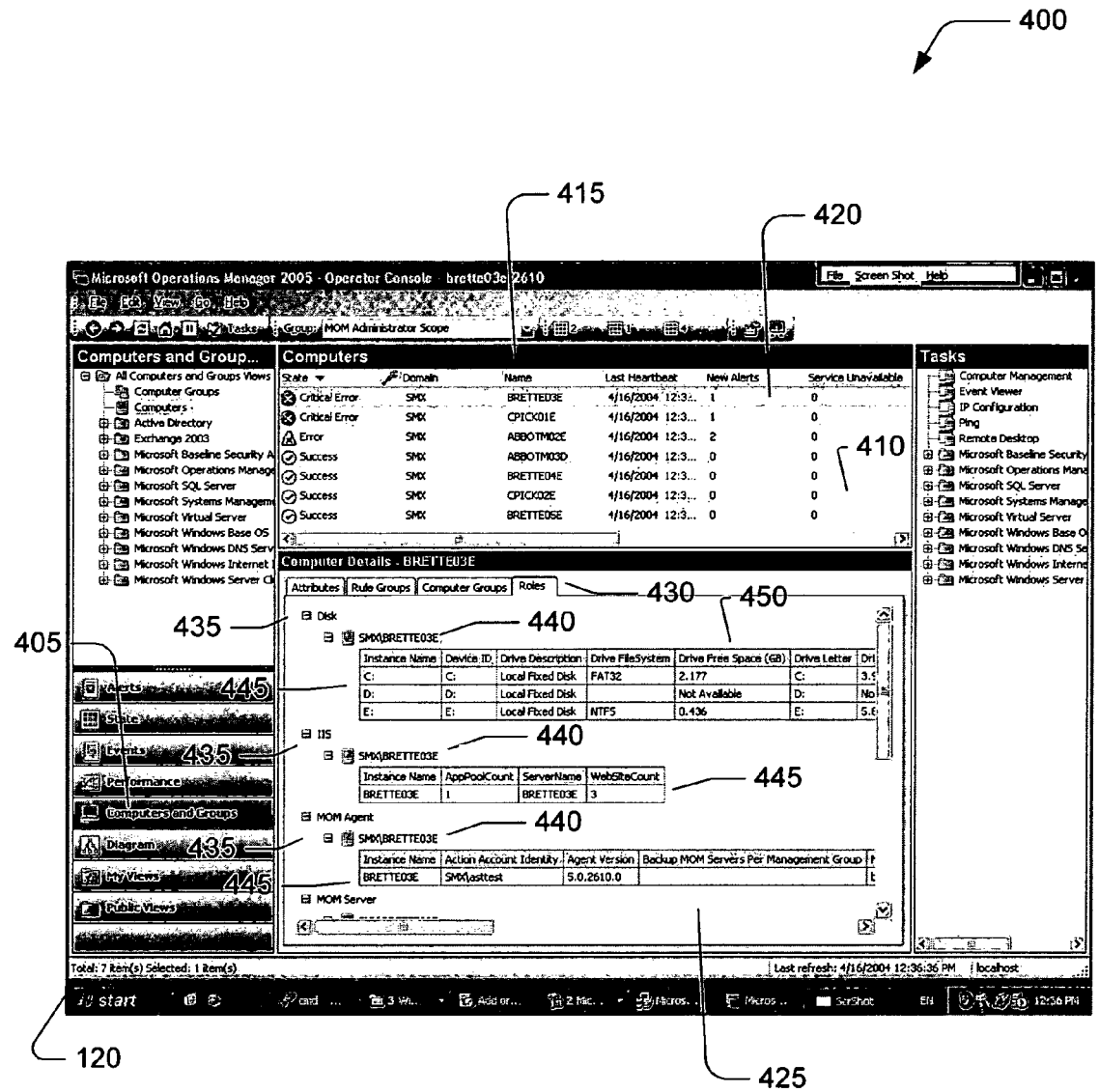
FIG. 4 is a diagram of a user interface that provides a computer view of the discovery data.

FIG. 4 illustrates an implementation of the user interface 120 that provides a computer view 400 of the discovery data 205. The computer view 400 can be activated by, for example, by clicking on the field 405 labeled "Computers and Groups". An area 410 lists the names and several parameters relating to computers, the names of which are listed in a column 415. Each computer is listed in a respective row 420.

Additional information on a given computer 415 can be obtained by clicking on the row 420 corresponding to that computer 420. Assuming that a user clicks on the row 420, area 425 is populated with further details pertaining to the computer named "BRETTE03E". A series of tabs 430 organize this information for convenience within area 425. By clicking on the tab labeled "Roles", the user can receive a list of roles in area 425. Items 435 represent particular classes of entities 115 found on the managed server 140 corresponding to the row 420 that was clicked to present the data shown in area 425. Items 440 represent respective instances of each class 435. For each instance 440 of a class 435, a set of properties 445 is presented. For example, table 450 presents the respective properties of three instances of the class "disk" found on the computer "BRETTE03E" by the discovery script 155.

Figure 5:
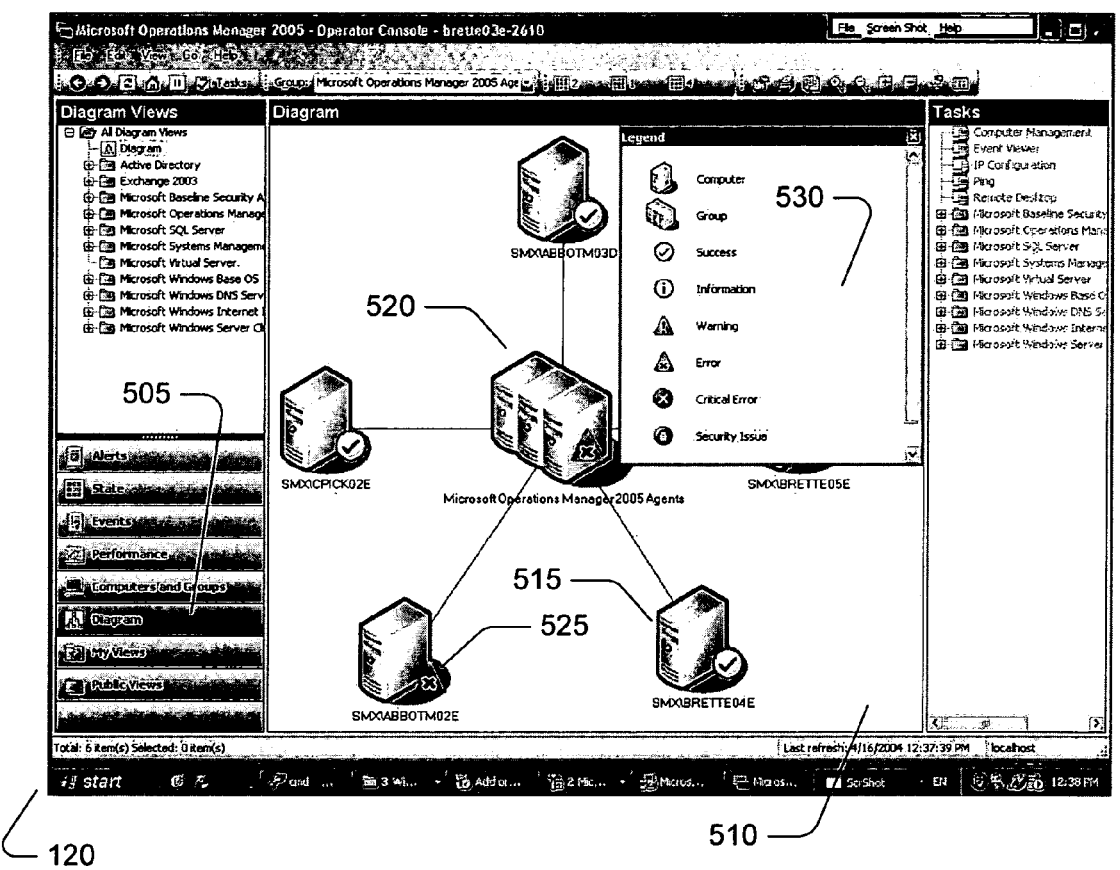
FIG. 5 is a diagram of user interface that provides a diagram or topological view of the discovery data.

FIG. 5 illustrates an implementation of the user interface 120 that provides a diagram or topological view 500 of the discovery data 205. The diagram view 500 can be activated by, for example, clicking on a field 505. The diagram view 500 includes an area 510 that presents icons 515 representing the various managed servers 140 within the management system 100, along with an icon 520 representing the management server 125. The diagram view 500 also associates a further respective icon 525 with each of the icons 515 and 520, to indicate the state or status of the entities represented by the icons 515 and 520. The diagram view 500 can also include a legend 530 that can be displayed on command to explain the meaning of each of the icons 515, 520, and 525.

Figure 6:
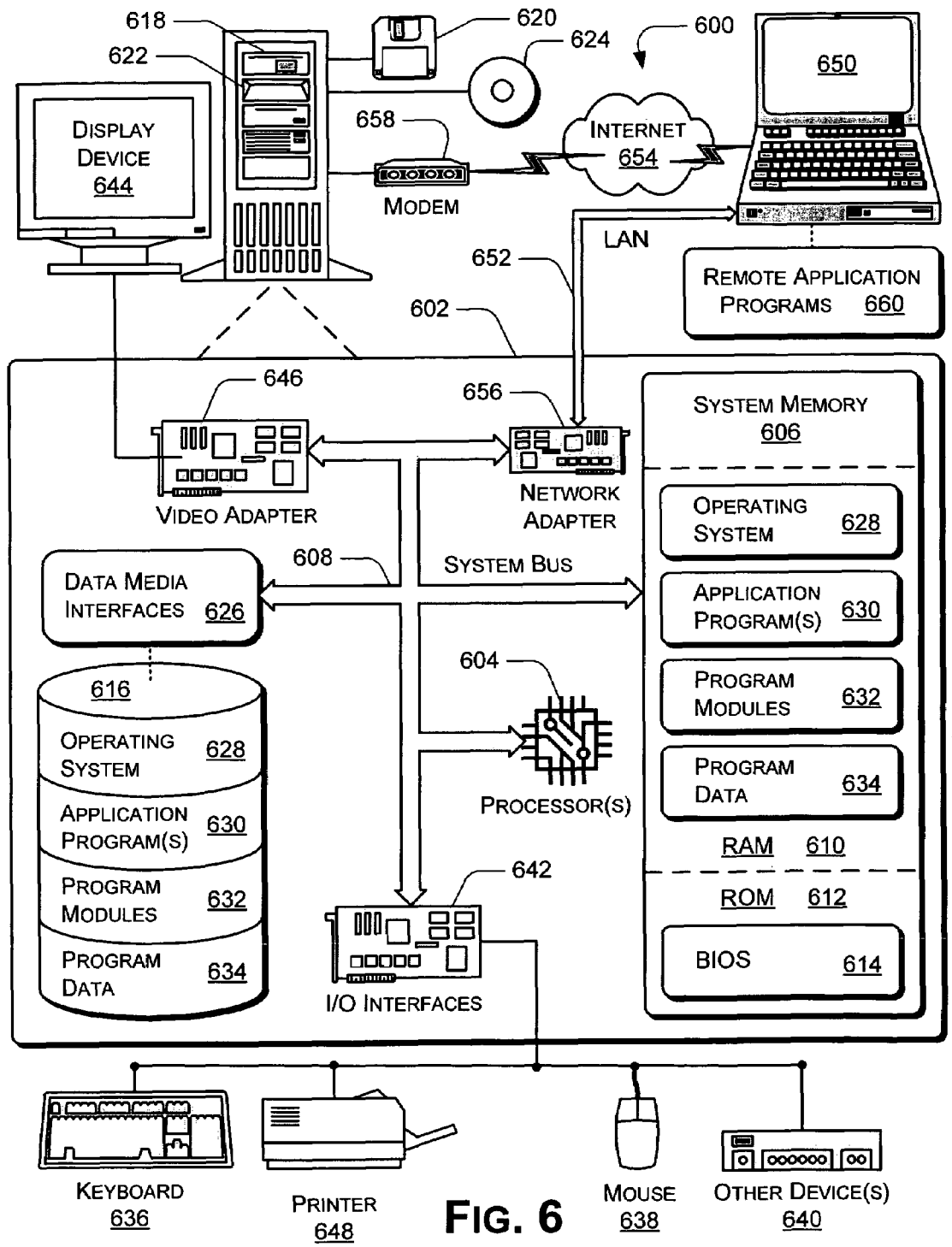
FIG. 6 illustrates a computing environment within which systems and methods for efficient processing of time-bounded messages, as well as the computing, network, and system architectures described herein, can be either fully or partially implemented.

FIG. 6 illustrates a computing environment 600 for efficiently processing time-bounded messages, and for fully or partially implementing the computing, network, and system architectures described herein. More particularly, the computing environment 600 may be suitable for implementing and/or supporting various components described herein, including but not limited to aspects of the user interface 120, the management server 125, the managed servers 140, the database connector component 215, the host process 160, and the like.

Exemplary computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, but are not limited to, one or more processors 604 (e.g., any of microprocessors, controllers, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on RAM 610, ROM 612, hard disk 616, magnetic disk 620, and/or optical disk 624, including by way of example, an operating system 628, one or more application programs 630, other program modules 632, and program data 634. Each of such operating system 628, application program(s) 630, other program modules 632, program data 634, or any combination thereof, may include one or more embodiments of the systems and methods described herein.

Computing device 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 602 via any number of different input devices such as a keyboard 636 and pointing device 638 (e.g., a "mouse"). Also, the user can use a mobile phone as a client to practice the teachings herein. More particularly, the user interface 120 as shown in FIGS. 1-5 may be adapted as appropriate to be supported by a mobile phone used by the author 105. Other input devices 640 (not shown specifically) may include a microphone, joystick, game pad, controller, satellite dish, serial port, scanner, and/or the like. These and other input devices are connected to the processors 604 via input/output interfaces 642 that are coupled to the system bus 608, but may be connected by other interface and bus structures, such as a parallel port, game port, and/or a universal serial bus (USB).

A display device 644 (or other type of monitor) can be connected to the system bus 608 via an interface, such as a video adapter 646. In addition to the display device 644, other output peripheral devices can include components such as speakers (not shown) and a printer 648 which can be connected to computing device 602 via the input/output interfaces 642.

Computing device 602 can operate in a networked environment using logical connections to one or more remote computers, such as remote computing device 650. By way of example, remote computing device 650 can be a personal computer, portable computer, a server, a router, a network computer, a peer device or other common network node, and the like. The remote computing device 650 is illustrated as a portable computer that can include any number and combination of the different components, elements, and features described herein relative to computing device 602.

Logical connections between computing device 602 and the remote computing device 650 are depicted as a local area network (LAN) 652 and a general wide area network (WAN) 654. Such networking environments are commonplace in offices, enterprise-wide computer networks, intranets, and the Internet. When implemented in a LAN networking environment, the computing device 602 is connected to a local network 652 via a network interface or adapter 656. When implemented in a WAN networking environment, the computing device 602 typically includes a modem 658 or other means for establishing communications over the wide area network 654. The modem 658 can be internal or external to computing device 602, and can be connected to the system bus 608 via the input/output interfaces 642 or other appropriate mechanisms. The illustrated network connections are merely exemplary and other means of establishing communication link(s) between the computing devices 602 and 650 can be utilized.

In a networked environment, such as that illustrated with computing environment 600, program modules depicted relative to the computing device 602, or portions thereof, may be stored in a remote memory storage device. By way of example, remote application programs 660 are maintained with a memory device of remote computing device 650. For purposes of illustration, application programs and other executable program components, such as operating system 628, are illustrated herein as discrete blocks, although it is recognized that such programs and components reside at various times in different storage components of the computing device 602, and are executed by the one or more processors 604 of the computing device 602.

Although embodiments for discovery, maintenance, and representation of entities in a managed system environment have been described in language specific to structural features and/or methods, it is to be understood that the subject of the appended claims is not necessarily limited to the specific features or methods described. Rather, the specific features and methods are disclosed as exemplary implementations of efficiently processing of time-bounded messages.

The invention claimed is:

1. A method comprising:
    creating a definition, by a user, of a plurality of rules on a management entity for discovering data about at least one remote entity located within at least one managed server; the remote entity comprising an application, and a list of SQL instances on at least one managed server and the rules are designed to discover configuration information about one or more remote entities that are located within at least one managed server;
    associating a plurality of classes with the rules;
    receiving discovery data representing one or more of the plurality of classes by the management entity from the remote entity in response to the rules being executed in an environment in which the remote entity is deployed; and
    validating the discovery data by comparing the discovery data against a schema listing valid classes.

2. The method of claim 1, further comprising embodying the rules in a discovery script.

3. The method of claim 1, further comprising storing the discovery data in a data store.

4. The method of claim 1, further comprising presenting the discovery data in a user interface.

5. The method of claim 1, further comprising defining at least one management pack that includes the rules.

6. An apparatus comprising:
    at least one agent running on a respective server being managed by a management system and generating discovery data in response to at least one discovery rule wherein the discovery rule is designed to discover configuration information of at least one remote entity located within the respective server that is being managed by the management system, the remote entity comprising an application and a list of SQL instances;
    at least one management server adapted to transmit the discovery rule for execution by the agent and to receive the discovery data from the agent, the management server including at least one database connector component that is adapted to validate the discovery data by comparing the discovery data to a schema listing valid classes.

7. The apparatus of claim 6, wherein the agent is adapted to withhold the discovery data from the management server if the discovery data is unchanged relative to further discovery data that was previously sent to the management server.

8. The apparatus of claim 6, further comprising a user interface adapted to present the discovery data.

9. The apparatus of claim 8, wherein the user interface is adapted to present data representing respective states of a plurality of computers managed by the management system discovery in response to the discovery data.

10. The apparatus of claim 8, wherein the user interface is adapted to present data representing a plurality of respective computers, and wherein for at least one of the computers, the user interface presents data representing at least one instance of at least one class located on the computer in response to the discovery rule, and wherein for the instance of the class, the user interface presents data representing at least one property for the instance.

11. The apparatus of claim 8, wherein the user interface is adapted to present the discovery data as a diagram that includes a plurality of respective icons, each representing a respective one of a plurality of computers, and wherein for each of the computers, the diagram includes a further icon representing a state of the computer as indicted by the discovery data.

12. One or more program products encoded on a computer readable storage media comprising computer executable instructions that, when executed, direct a computing device to:
    defining, by a user, a plurality of rules for discovering data about at least one remote entity located within at least one managed server; wherein the remote entity comprises an application and a list of SQL instances on at least one managed server and the rules are designed to discover configuration information about one or more remote entities that are located within at least one managed server;

associate a plurality of classes with the rules;

receive discovery data representing one or more of the plurality of classes by the management entity from the remote entity in response to the rules being executed in an environment in which the remote entity is deployed; and validate the discovery data representing the classes by comparing the discovery data against a schema listing valid classes.

* * * * *